United States Patent

Eisenbrandt et al.

[11] Patent Number: 5,818,428
[45] Date of Patent: Oct. 6, 1998

[54] APPLIANCE CONTROL SYSTEM WITH CONFIGURABLE INTERFACE

[75] Inventors: Gerald A. Eisenbrandt, Lincoln Township; John R. Bentley, St. Joseph, both of Mich.

[73] Assignee: Whirlpool Corporation, Benton Harbor, Mich.

[21] Appl. No.: 475,418

[22] Filed: Jun. 7, 1995

Related U.S. Application Data

[63] Continuation of Ser. No. 268,664, Jun. 29, 1994, abandoned, which is a continuation of Ser. No. 6,497, Jan. 21, 1993, abandoned.

[51] Int. Cl.⁶ .................................................. G09G 5/00
[52] U.S. Cl. ............................................. 345/173; 345/140
[58] Field of Search ................................. 345/156, 163, 345/168, 173, 35, 36, 37, 39, 140; 340/825.37, 825.31, 825.36; 395/334, 335, 333

[56] References Cited

U.S. PATENT DOCUMENTS

| | | | |
|---|---|---|---|
| 3,983,553 | 9/1976 | Kesling . | |
| 4,224,615 | 9/1980 | Penz | 340/712 |
| 4,241,400 | 12/1980 | Kiefer | 364/400 |
| 4,275,464 | 6/1981 | Schmidt | 371/15 |
| 4,309,584 | 1/1982 | Terakami | 219/10.55 B |
| 4,326,193 | 4/1982 | Markley et al. | 235/145 R |
| 4,374,381 | 2/1983 | Ng et al. | 340/711 |
| 4,413,314 | 11/1983 | Slater et al. | 340/706 |
| 4,418,398 | 11/1983 | Hornung | 364/141 |
| 4,454,501 | 6/1984 | Butts | 340/711 |
| 4,464,933 | 8/1984 | Santis | 340/700 |
| 4,510,778 | 4/1985 | Cotton | 68/12 R |
| 4,611,295 | 9/1986 | Fowler | 364/184 |
| 4,628,351 | 12/1986 | Heo | 340/711 |
| 4,628,439 | 12/1986 | Fowler | 364/138 |
| 4,633,227 | 12/1986 | Menn | 340/711 |
| 4,642,753 | 2/1987 | Easthill | 364/184 |
| 4,703,306 | 10/1987 | Barritt | 340/825.06 |
| 4,716,542 | 12/1987 | Peltz et al. | 340/700 |
| 4,812,963 | 3/1989 | Albrecht | 364/131 |
| 4,844,637 | 7/1989 | Buisson et al. | 341/23 |
| 4,885,694 | 12/1989 | Pray et al. | 364/464.01 |
| 4,886,638 | 12/1989 | Penkunas et al. | 419/15 |
| 4,896,223 | 1/1990 | Todome | 340/712 |
| 4,909,041 | 3/1990 | Jones | 62/99 |
| 5,016,003 | 5/1991 | Rice, Jr. et al. | 340/706 |
| 5,086,385 | 2/1992 | Launey et al. | 340/825.37 |
| 5,325,481 | 6/1994 | Hunt | 395/334 |
| 5,327,529 | 7/1994 | Fults et al. | 395/334 |
| 5,353,400 | 10/1994 | Nigarwara et al. | 395/334 |
| 5,450,540 | 9/1995 | Spohrer et al. | 395/334 |
| 5,515,496 | 5/1996 | Kaehler et al. | 395/334 |

*Primary Examiner*—Chanh Nguyen
*Attorney, Agent, or Firm*—Hill & Simpson

[57] ABSTRACT

A control system with a user configurable interface, particularly suitable for use in connection with appliances. Users can configure display screens either at a point of sale location or at home with, e.g., a personal computer.

18 Claims, 10 Drawing Sheets

```
                    SELECTION MENU
    CHOOSE              CHOOSE              88
 SWITCH DISPLAY     FUNCTION OPTIONS

82─◯           CHOICE 1    NONE/SELECTABLE/DEFAULT

84─▢           CHOICE 2    NONE/SELECTABLE/DEFAULT

86─⇧⇩                ⋮
                   CHOICE N    NONE/SELECTABLE/DEFAULT

SPECIFY:                    CHOOSE
   SWITCH OPERATION MODE    STATUS DISPLAY

TOGGLE INDIVIDUALLY         NONE
   SLEW-ALL CHOICES            LED
                               GRAPHIC
```

APPLIANCE CONTROL SYSTEM WITH CONFIGURABLE INTERFACE

This is a continuation of application Ser. No. 08/268,664, filed Jun. 29, 1994, now abandoned, which is a continuation of application Ser. No. 08/006,497, filed Jan. 21, 1993, now abandoned.

BACKGROUND OF THE INVENTION

The present invention generally relates to appliance control systems. More specifically, the invention relates to master control systems that can be adapted or configured for use with different appliances.

For the purposes of this application, the term "user interface" when used with respect to control systems refers to both the hardware and the software via which a user interacts with a control system, including, visual indicators, switches, and display systems thereof. For example, the layout of information on the screen on a computer monitor constitutes part of a user interface.

Master control systems for a plurality of appliances are known. U.S. Pat. No. 4,703,306 describes an appliance control system wherein a plurality of different types of appliances are connected to a central master controller. The master controller interfaces with the appliances by way of a like plurality of interface modules which communicate over the power transmission wiring, for example, in a house. The master controller includes individual controls for each appliance.

The user interface in the control system comprises a fixed panel with a plurality of indicators, switches, and knobs. The panel is divided into areas, each area being assigned to a different appliance. Each area includes unalterable dedicated controls for its associated appliance.

U.S. Pat. No. 4,812,963 describes a cooking computer system in which a control computer remotely controls one or more cooking appliance computers, each of which in turn controls a cooking unit. The remote computer is configured to wait for query from an operator with respect to the operation of a cooking unit before formatting a message displayed to the operator. In response to a query, for example, an inquiry concerning the status of a cooking unit condition such as temperature, the remote computer obtains and then displays the requested information.

It is known that the preferences of consumers as to what makes an appliance control easy to use are quite diverse. This makes it difficult to design a single control system which is perceived to be easy to use by everyone.

Further, there has been much interest in using personal computer based control systems employing user interfaces with a graphical environment, e.g. such as that used in the popular WINDOWS program sold by Microsoft Corporation.

Yet further, touch screen and software programmable switches (referred to as "soft keys") are used today in the control of many industrial processes. In this ares, a computer displays a screen designed to display various information and to allow for different sets of inputs.

Applications also exist for computer based software which allows the user to configure a design. One such program allows hair stylists to show a customer what they would look like with a certain hair style before actually adopting that hairstyle. Such system employs computer graphics techniques. Another program is used by home designers to show what a proposed interior or exterior design would look like with a particular house before construction or landscaping is started.

SUMMARY OF THE INVENTION

The present invention provides a control system with a user configurable interface. The user interface is configurable in terms of hardware as well as/or in terms of alterable visual displays.

In a preferred embodiment, the invention provides a microprocessor based control system with an externally supplied memory and a flexible display driver. The display can be of any type, for example, a cathode ray tube (CRT), a dot matrix array capable of at least low level graphics, or a standard fixed controller panel.

In an embodiment, the invention provides that the external memory comprises a memory such as a "SMART-CARD" or the equivalent.

In an embodiment, the invention provides that the control system comprises a general purpose computer, for example, a personal computer with control effected via standard digital input/output add-in boards and analog-to-digital (A/D) boards.

In an embodiment, the invention provides that the user configurable interface comprises, in part, a typical monitor and keyboard and/or mouse employed with the personal computer.

In a preferred embodiment, the invention provides that the user configurable interface, in part, comprises a touch screen.

In a preferred embodiment, the invention provides that the configurable user interface, in part, comprises computer programs capable of presenting data in a variety of selectable formats such as bar graphs, simulated light emitting diodes, pie charts, et cetera. the computer programs can be supplied via floppy disks, a hard drive, or other storage devices.

In a preferred embodiment, the invention provides that data relating to the selected formats resides in the externally supplied memory.

In a preferred embodiment, the invention provides for a computer program that allows the user to select from a wide variety of display formats and control program choices to create the data and computer programs residing in the externally supplied memory.

These and other features of the invention will become clearer with reference to the following detailed description of the presently preferred embodiments and accompanying drawings.

DETAILED DESCRIPTION OF THE PRESENTLY PREFERRED EMBODIMENTS

In accordance with the invention, a control system, preferably for one or more appliances, is provided with a user configurable interface, the configurability being a function of computer programming. User configurability of the interface permits a user to customize the control system interface to suit that user's particular needs. Moreover, since the configurability is provided as a function of computer programming, the control system can be made generic to a wide array of appliances with the user providing the configuration depending in part from the appliance/appliances purchased.

Figure 1:
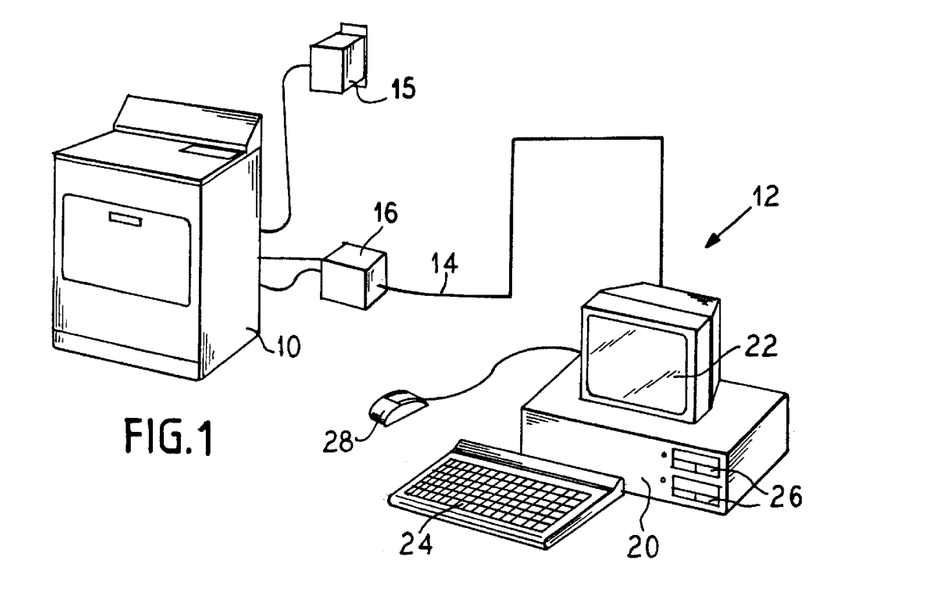
FIG. 1 illustrates in perspective view an appliance in communication with a user configurable control system.

In FIG. 1 there is illustrated an appliance 10, in this case a dryer, subject to the control of a control system 12. To this end, the dryer 10 communicates with the control system 12 via a direct cable 14 leading to a control module 16 or via a control module 15 which is adapted to transmit signals over the power wiring of, for example, a house, or via an infrared link. Hereinafter reference will be made to the module 16, however the statements made are equally applicable to the module 15 with the necessary changes.

The control system 12, as illustrated, preferably comprises a general purpose personal computer 20 programmed to control the appliance 10 and to interface with a user. To this end, the personal computer 20 includes a monitor 22, a keyboard 24 and data storage drives 26. The computer 20 also can include a mouse 28 or touch screen on the monitor 22 or other input devices.

Figure 2:
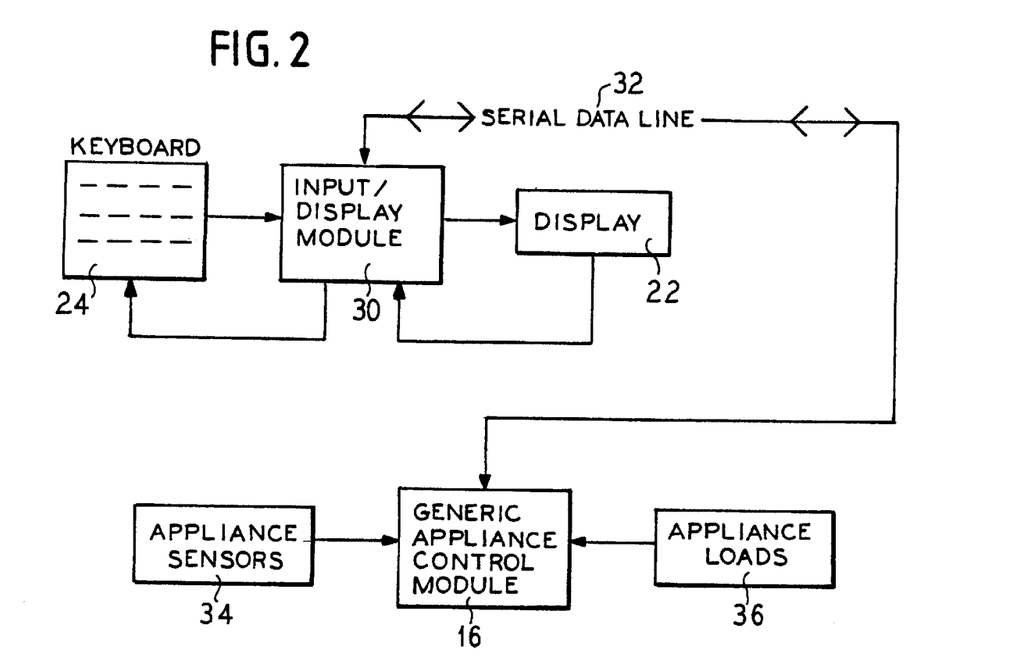
FIG. 2 illustrates a functional block diagram of the control system of FIG. 1.

As illustrated in FIG. 2, the control system 12 is configured so that the keyboard 24 and monitor 22 interface with an input/display module 30, namely the circuits and software of the computer 20 and the monitor 22. The computer 20 also communicates via a serial data line 32, whether it is over the power wiring of a house or via an infrared link or via a direct link 14 (as shown in FIG. 1) to a module 16. The module 16 then communicates with various sensors 34 and controls 36 of the appliance 10.

With continuing reference to FIG. 2, the module 16 can comprise a generic appliance control module while the input/display module 30 can comprise an input/display board that could be located within an appliance or mounted as a remote control module within the kitchen cabinetry, or as part of the control system 12 of FIG. 1. In either case, the module 30 would consist of a microcomputer, input device, and display capable of accommodating system timing, user input interpretation, and display driving. The generic control module would then handle load switching and appliance related sensors. Communication through the serial line 32 could be through any command language.

Figure 9:
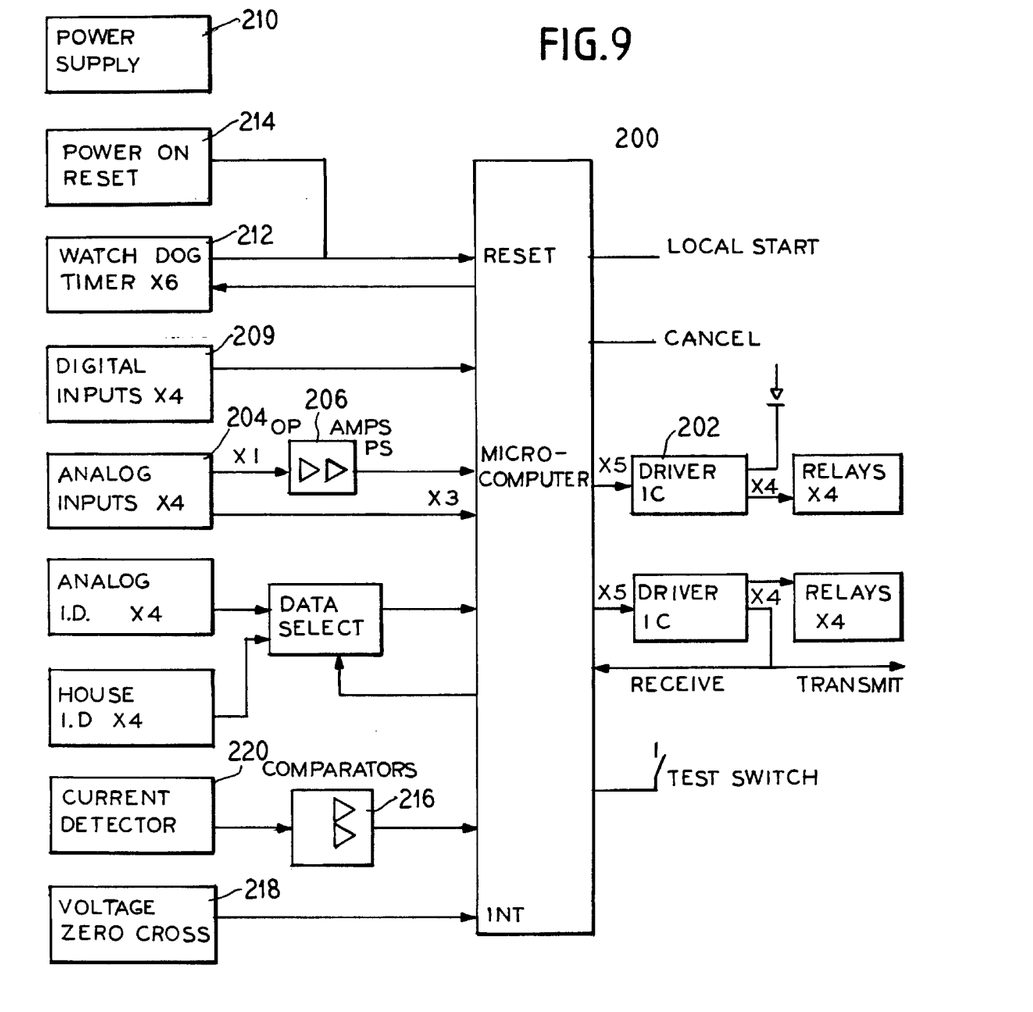
FIG. 9 illustrates a functional block diagram of a generic appliance control module that can be used in the control system of FIGS. 1 and 2.
Figure 10A:
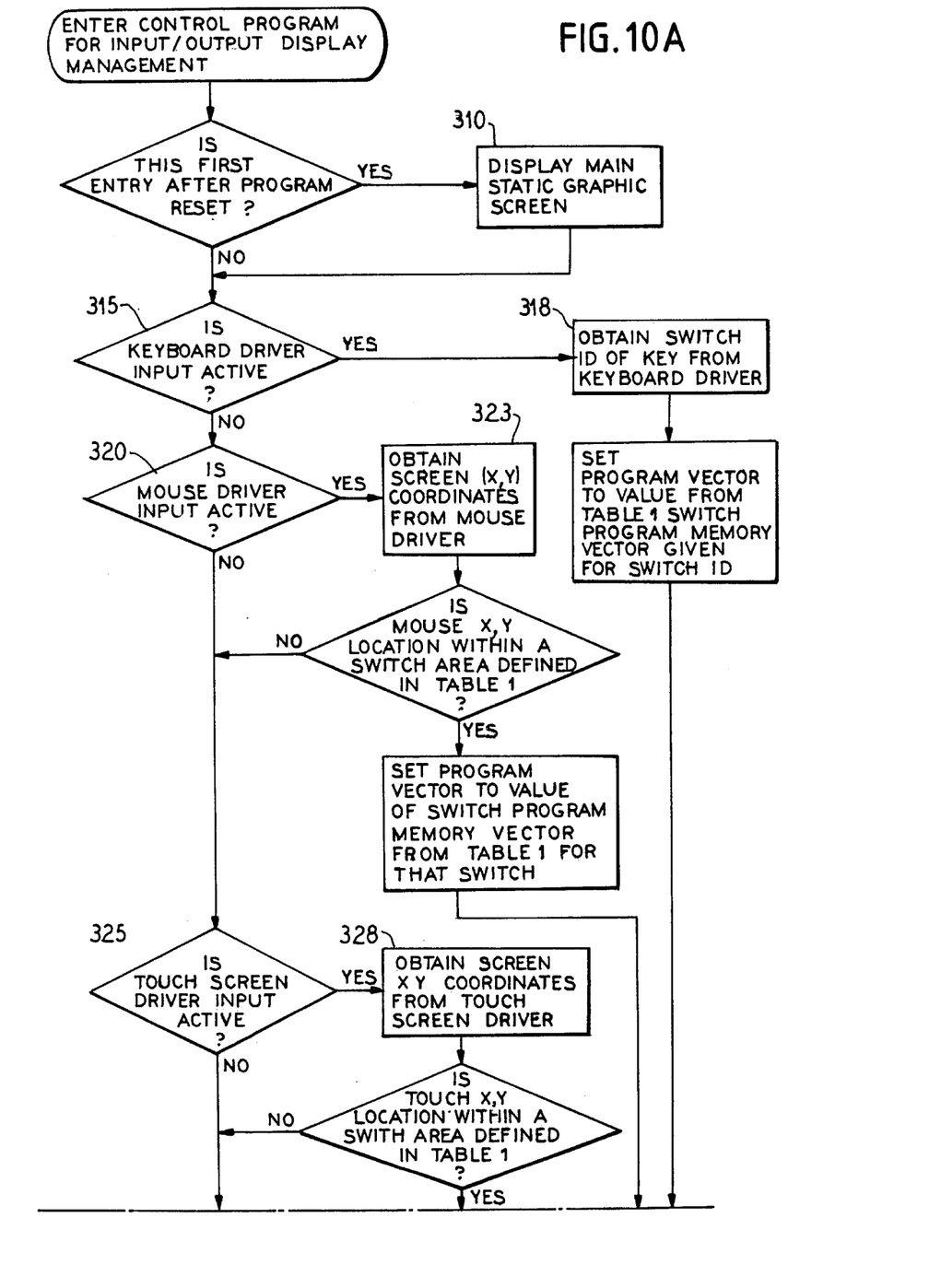
FIG. 10A–10D illustrates a flow chart of a computer program for input/output display control that can be used in a system such as that of FIGS. 4 and 9.
Figure 10B:
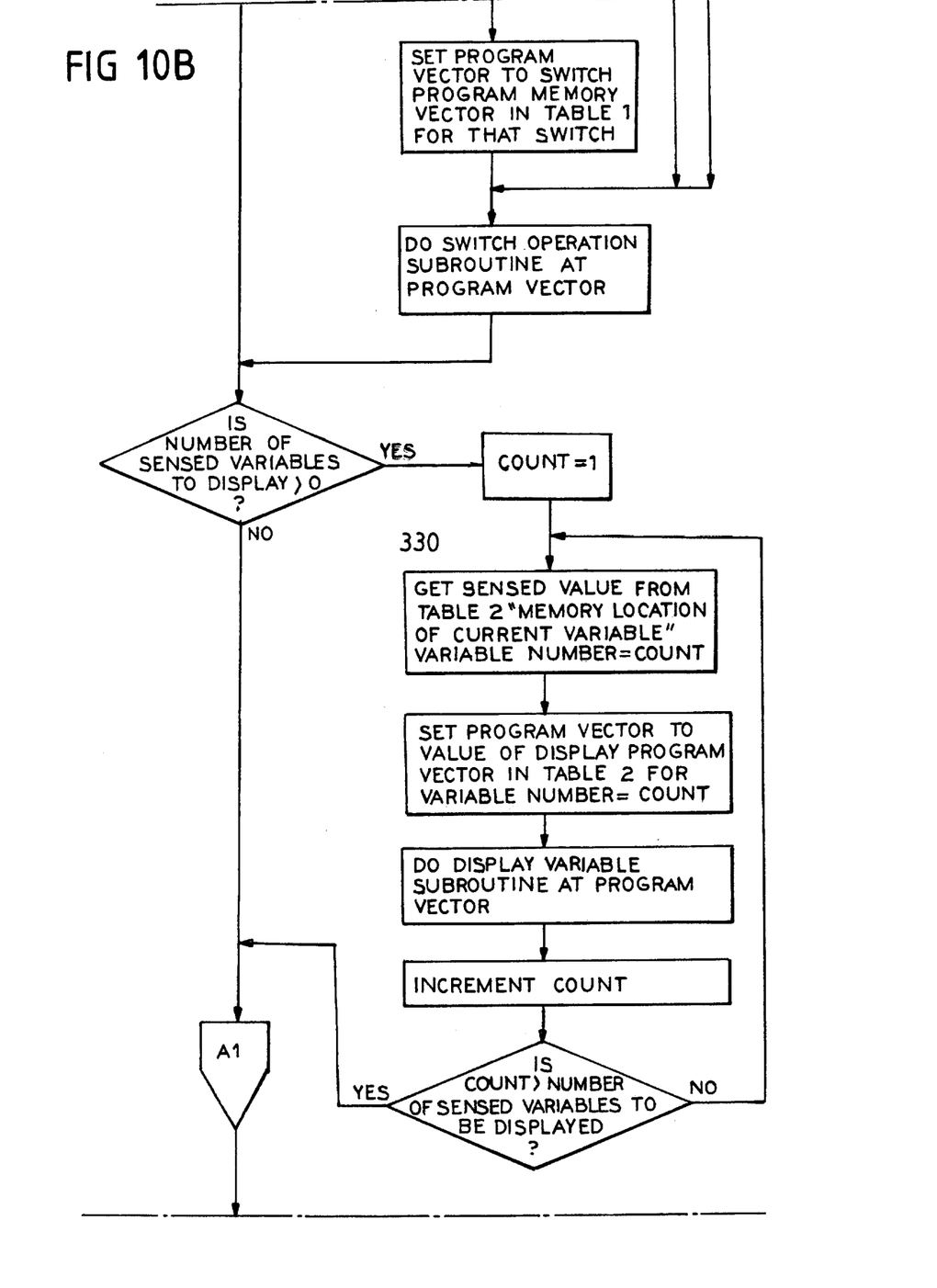
Figure 10C:
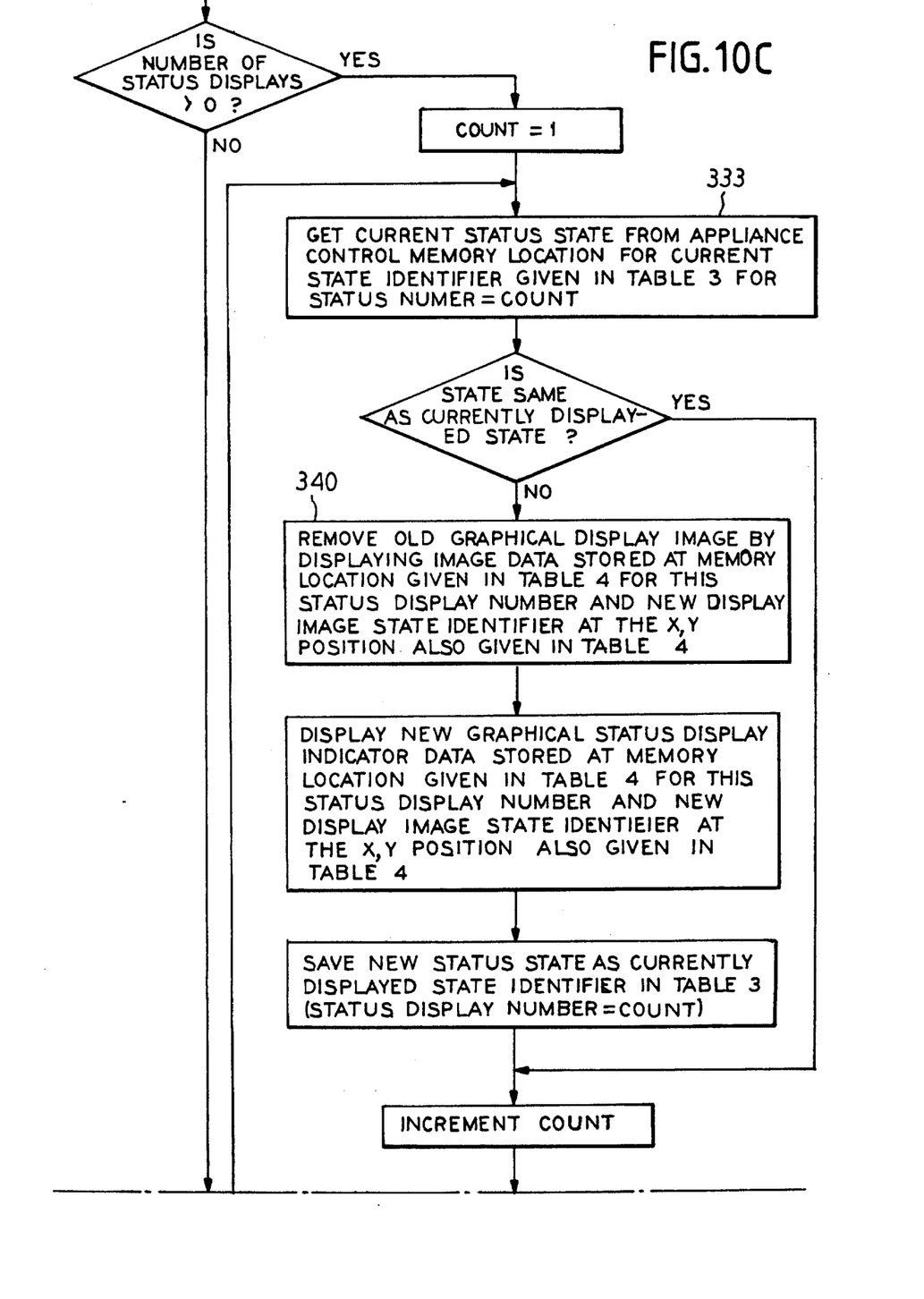
Figure 10D:
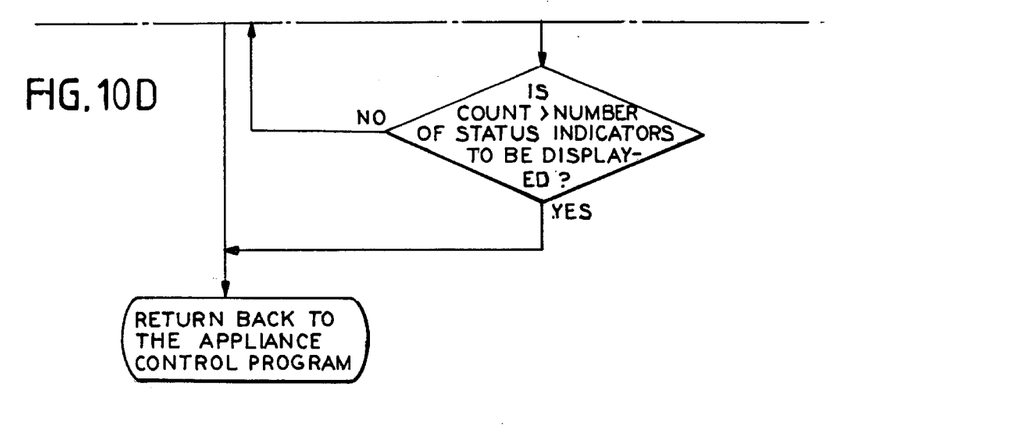

In FIG. 9 there is illustrated a functional block diagram of a generic appliance control module 16. As illustrated, the core of the generic appliance control module 16 is a microcomputer 200 with a read only memory (ROM), random access memory (RAM), four analog-to-digital channels, an internal timer, interrupts and a clock, not shown in FIG. 9 but well known in the art. Coupled to the microcomputer are a power supply 210, a computer watchdog timer 212, a power on reset 214, and a plurality of inputs and outputs.

The inputs and outputs in the presently preferred embodiment include some of the following:

one or more high current driver integrated circuits 202 for powering a general purpose LED indicator, the transmission line, and relay/triacs;

one or more analog inputs 204 for handling analog sensors, for example, thermistors;

one or more pairs of operational amplifiers 206 included for sensor signal conditioning, for example, as is currently performed in electronic oven controls;

pairs of comparators 216 and a current sensor 220 to measure current presence for safety and diagnostic purposes;

a voltage zero crossing input 218 on a computer interrupt line for reference timing for load actuation or motor phase measurement;

a receiver line paired with the above-mentioned transmit line;

six digital inputs for items such as thermostat contacts, door switches, over fill contacts, etc.;

a test switch for service diagnosis or assembly testing;

a local start switch;

a local cancel switch to abort operation at the appliance;

a general purpose LED to describe operation and/or to use as a diagnostic indicator; and means to identify the house and appliance type.

The dual current driver integrated circuits are used to provide redundancy to drive relay pairs for powering items such as range surface elements or oven elements in order to satisfy Underwriters Laboratories' safety requirements for range and oven products.

The module 16 also can comprise a generic diagnostic module as set forth in commonly assigned, co-pending application, titled "Appliance Module" and having Ser. No. 07/817,002 filed Jan. 3, 1992, the teachings of which are fully incorporated by reference.

Due to the genericness of the configuration of the central system 12 of FIGS. 1 and 2, the control system 12 can be applied to a variety of appliances. Essentially, it is the only requirement that the computer program or software executed on the computer support a particular appliance and that there be the necessary data inputs/outputs coupled to the particular appliance for effective control thereover.

Figures 3, 4:
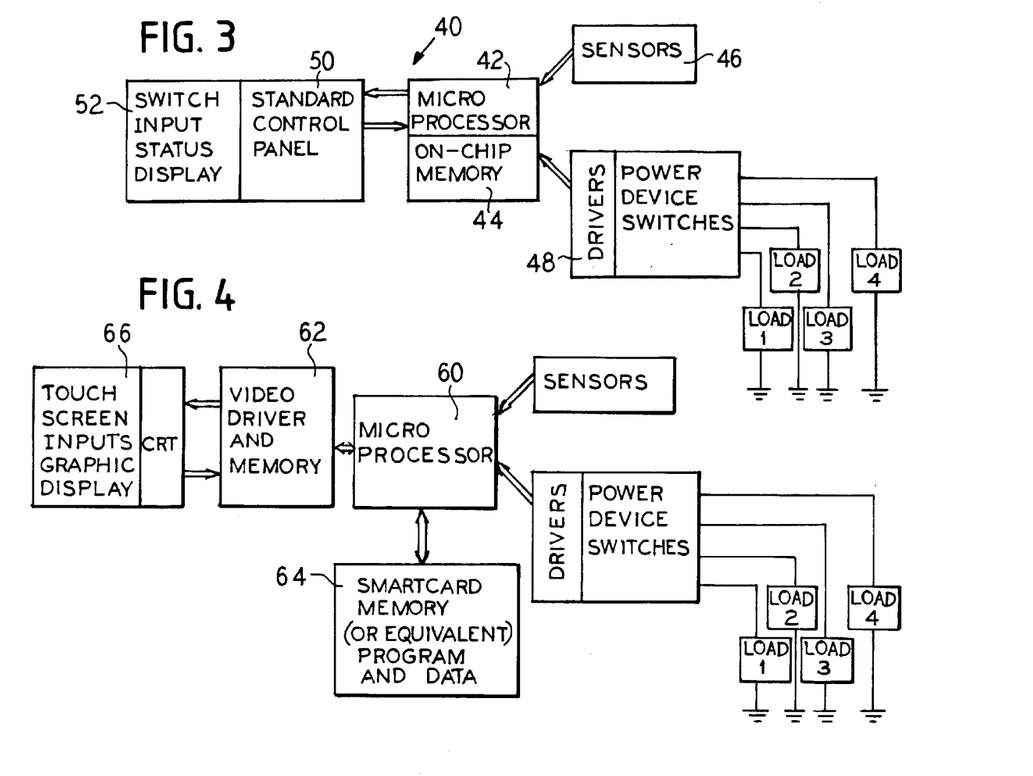
FIG. 3 illustrates a block diagram of a control system that is not user configurable.
FIG. 4 illustrates a block diagram of a control system constructed for user interface configurability.

FIGS. 3 and 4 illustrate alterations to a control system configuration that can be undertaken to implement the present invention. In FIG. 3 a system 40 is illustrated as including a microprocessor 42 with an on-chip memory 44. Interacting with the microprocessor 42 are the appliance sensors 46 and switch drivers 48 as well as a standard non-configurable control panel 50 with associated display 52.

As illustrated in FIG. 4, rather than employ a standard control panel 50, a microprocessor 60 can interact with a flexible video driver 62 and an external memory 64 in the form of an add-on card. The video driver 62 is used to drive a suitable display 66 such as a touch screen, graphic monitor, etc. The memory 64 is used to store the computer programs and sensor and driver data necessary to provide user interface configurability. The memory 64 preferably comprises a SMARTCARD or its equivalent.

Figure 5:
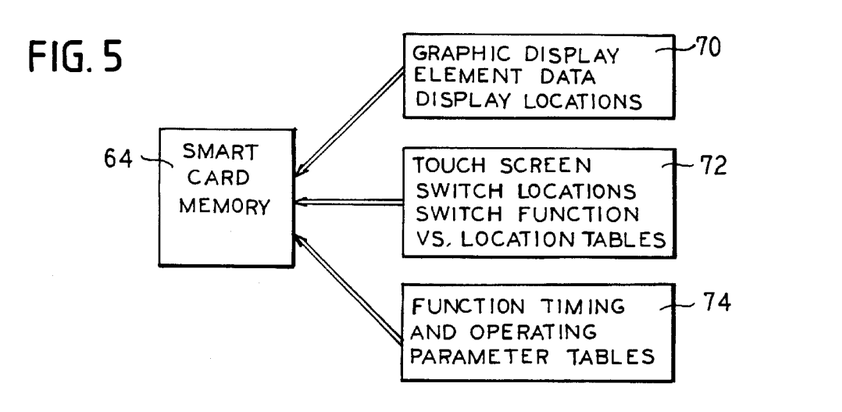
FIG. 5 illustrates a block diagram of an external memory used in the control system of FIG. 4 and interaction thereof.

In FIG. 5, the types of data and programming stored in the memory 64 are illustrated. Therein it can be seen that an external memory such as the memory 64 preferably stores graphic display element data as well as display locations data 70. These data 70 are used if a graphics monitor is employed at the display 66 to position displays.

Further, the memory 64 stores data 72 identifying the locations of touch screen switches as well as tables correlating functions with the various touch screen switches. These data 72 then are employed if the user interface includes a touch screen.

Yet further, the memory 64 stores data 74 concerning operating parameters and function timing for a variety of appliances. These data 74 are employed to operate the appliances connected to the control system.

Figures 6, 7A, 8:
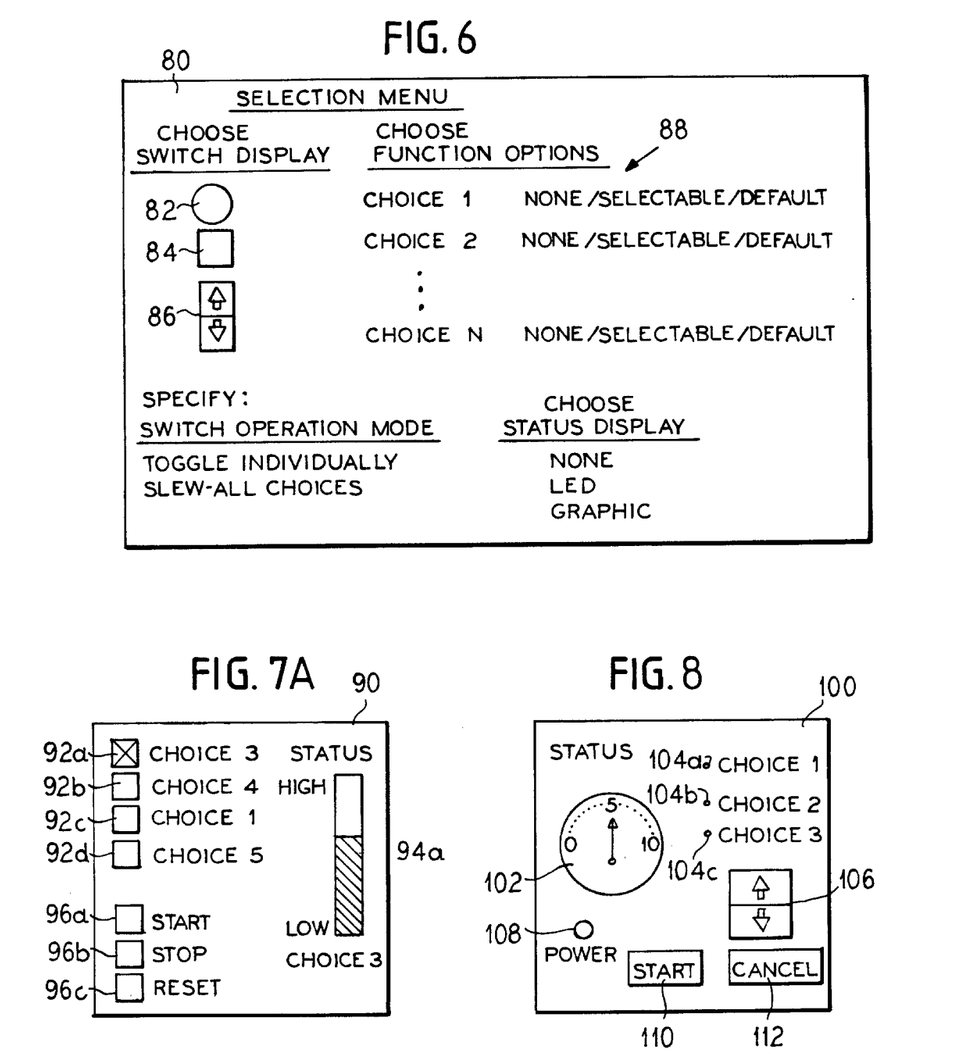
FIG. 6 illustrates a configuration screen via which a user can configure interface screens.
FIGS. 7A–7C illustrate one possible user defined interface screen and use thereof.
FIG. 8 illustrates another possible user defined interface screen.

In FIG. 6, there is illustrated an interface configuration display 80 that can be generated on a monitor screen by a computer program which enables the display control to be configured wherein a user is presented with an array of choices for configuring the interface. In this regard, the user is presented with choices regarding the types of switches, format and appliance functions and parameters subsequently to be displayed during control system use. Selected switches and display elements are configured in a layout on the screen as specified by the user for his/her ease of use and understanding.

For example, the selected switches can include a default of "no switches," an on/off switch 82, a select switch 84, or a set of increase/decrease switches 86. Further, the user could specify whether all switches can be toggled on and off, or slewed to the on state.

For each user input selection, such as water temperature selection on a washer, the switch choices can include "none" (i.e., manufacturer's default or function not used), an "on/off" or select type switch (i.e., user defined default) or a set of "increase/decrease" type switches (i.e., user selectable from range of values). Switch action types are momentary, toggle on/off or momentary type switch that repeats at intervals while pressed.

The user can also select the type of parameters or functions 88 for which data are presented on the interface, referred to generically herein as "Choices." For example, Choice 1 could be a dryer temperature or a wash cycle time. For each choice the user also can select a switch action type.

In displaying data relating to a chosen function/parameter, the user can also select a display format associated therewith. For example, a display associated with a parameter/function would not be displayed by selecting "none," or presented as a digital read-out by selecting "LED," or presented as an analog read-out by selecting "Graphic."

Following selection of the various functions/parameters to be displayed as well as the display formats therefor, data relating to the configuration are stored in the memory 64. Then whenever the control system 12 is used, the user reconfigured interface will be used.

In FIGS. 7A–7C and 8, there are illustrated two alternative control panels 90 and 100 which can be selected as the user interfaces following user configuration in accordance with the selections presented in the display of FIG. 6.

Figure 7B:
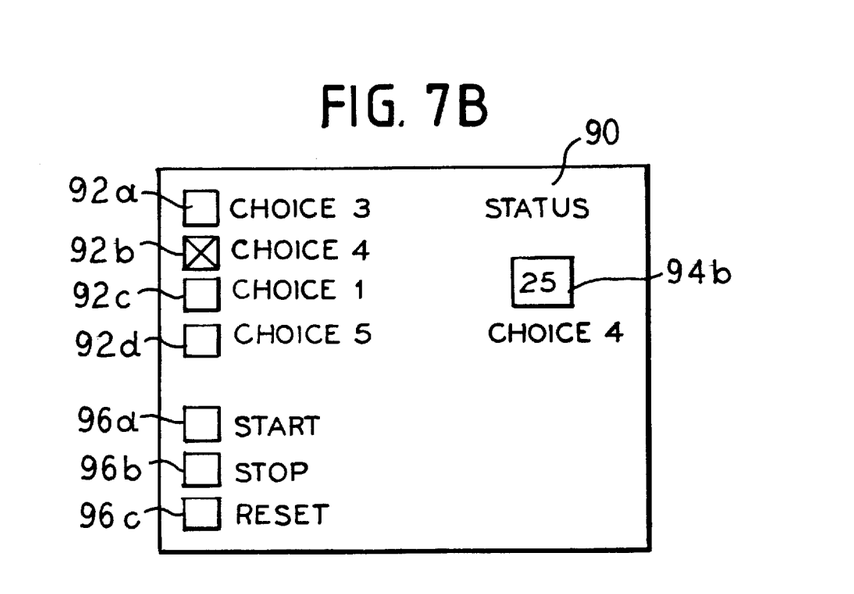
Figure 7C:
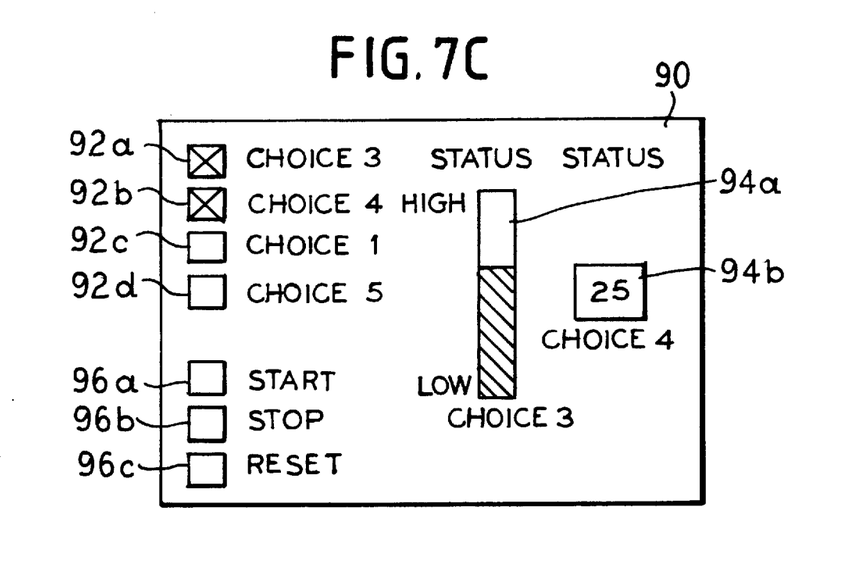

In FIGS. 7A–7C, the control panel includes square shaped selection switches 92a, 92b, 92c, and 92d for four functions: Choices 3,4,1, and 5, respectively.

In FIG. 7A, a single graphical display 94a is presented for Choice 3. During operation of course, should the user select Choice 4 by touching the square 92b for Choice 4, the display 92b (LED or graphic) associated with that function/parameter would replace that of Choice 3, as illustrated in FIG. 7B, or alternatively, be positioned alongside the display of Choice 3 (assuming Choice 3 also was selected as shown, as illustrated in FIG. 7C).

In accordance with FIG. 8, a displayed control panel 100 can include the selection for display of, for example, three functions/operations: Choices 1, 2, and 3. The status of any selected function/operation can be displayed as a simulated analog meter 102. Selection of the display of a particular function/operation is effected by depression of the selection switches 106a and 106b associated with display indicators 104a and 104b, and 104c associated with Choices 1, 2, and 3, respectively. Increase switch 106a and decrease switch 106b can be used to select choices 1, 2 or 3. For example, when choice 2 is displayed in meter 102 and display 104b is on, depression of switch 106a will result in choice 1 being displayed in meter 102 and display indicator 104b being "off" and display indicator 104a being "on."

Power switch 108 can be used to apply or shut off power to the associated appliance. Start switch 110 and cancel switch 112 can be used to effect commencement or termination of a cycle of operation of the associated appliance.

The different displays that could be configured are virtually innumerable depending on all of the capabilities provided in the configuration software as well as the imagination of the user and appliance capabilities. The above description merely provides examples of but two possible control panel displays.

The configuration software generally would be used at the point of sale to obtain the user's preferences and to generate the memory card 64 with control display graphics. However, it also is envisioned that users with a personal computer could do their own configuration or modify their control system interfaces as their needs change. By changing the configuration, new features could be added to the appliance as they become available.

For example, at the point of sale, a user would specify the types of appliances to be connected to the control system. The user would also specify the hardware included in the control system, e.g., a color monitor and mouse instead of a touch screen. Then the user would specify or configure the displays to be presented during operation of the control system. All of this information then would be stored in a memory on the memory card 64 which is carried to the installation site.

Once configured, the user could be supplied with the memory card 64 to be placed in his controller/computer. The computer already would be programmed to read a standard set of hardware inputs, status of displays and sensor inputs, and to turn on or off a set of hardware outputs. The information in the add-in memory card 64 would specify labels for the hardware inputs and outputs, what and how the labels are to be interpreted to create the information displayed to user, to provide the logic to interpret sensor inputs and to interpret output labels to determine when and how to turn the hardware on and off.

At the installation site, the user could be provided with the opportunity to reconfigure, for example, the display formats of the appliance information. The configuration program, however, must ensure that the user does not specify information, appliance, etc. that are not available.

Further, features could be customized, for example, by leaving out certain parts which the user does not need, to make the control as simple as possible. Alternatively, the user could be given full access to all possible settings to give total customized control. Further, various preferences could be preset as part of the customizing. For example, a cook top control with a temperature sensor could be preset to temperature setting in accordance with those dishes most often prepared by the user and the utensils used for cooking them.

The operation of this system is intended to work with a microprocessor based appliance control system. It is assumed that one knowledgeable in the art would be familiar with the programming of an appliance microprocessor control like that shown in FIG. 9.

In FIGS. 10A–10D and 11 are illustrated a set of flow charts described herein that are intended to describe an algorithm for use with a system such as that shown in FIGS. 4 and 9. With the addition of serial communication software which is capable of transferring the contents of a memory location in control system 12 of FIG. 1 to a memory location in the generic appliance control module 16 of FIG. 2, or vice versa, these flow charts may be generalized to operate the system shown in FIG. 2.

It is further assumed that the microprocessor of FIG. 4, is programmed in a manner whereby the control determines the operation of the appliance in accordance with a given table of parameters contained in the microprocessor's RAM memory. For an automatic washer, this table of parameters would for example contain the cycle type, such as permanent press or delicate, which defines the timing sequence of the wash operations, the wash and rinse temperatures and water fill level. In this RAM memory area are also contained memory storage locations for values read from the various sensors, analog inputs 204 or digital inputs 209 in FIG. 9. It also contains the values of the states of any status variables. Such programming technique should be familiar to those with experience programming appliance controls.

The typical programming for the appliance control would be used but requires several modifications from the usual programming method. First, provision must be made to branch to the program located in the external memory, 64 in FIG. 4, on a periodic basis of at least 10 or more times a second. As would be familiar to those versed in the art, this can be done by timed software interrupts or through a repetitive loop in the control program. Programming normally used for monitoring membrane switch inputs, displaying outputs to a vacuum fluorescent display, etc. would typically be removed from software as found in a non-configurable control.

Figure 11:
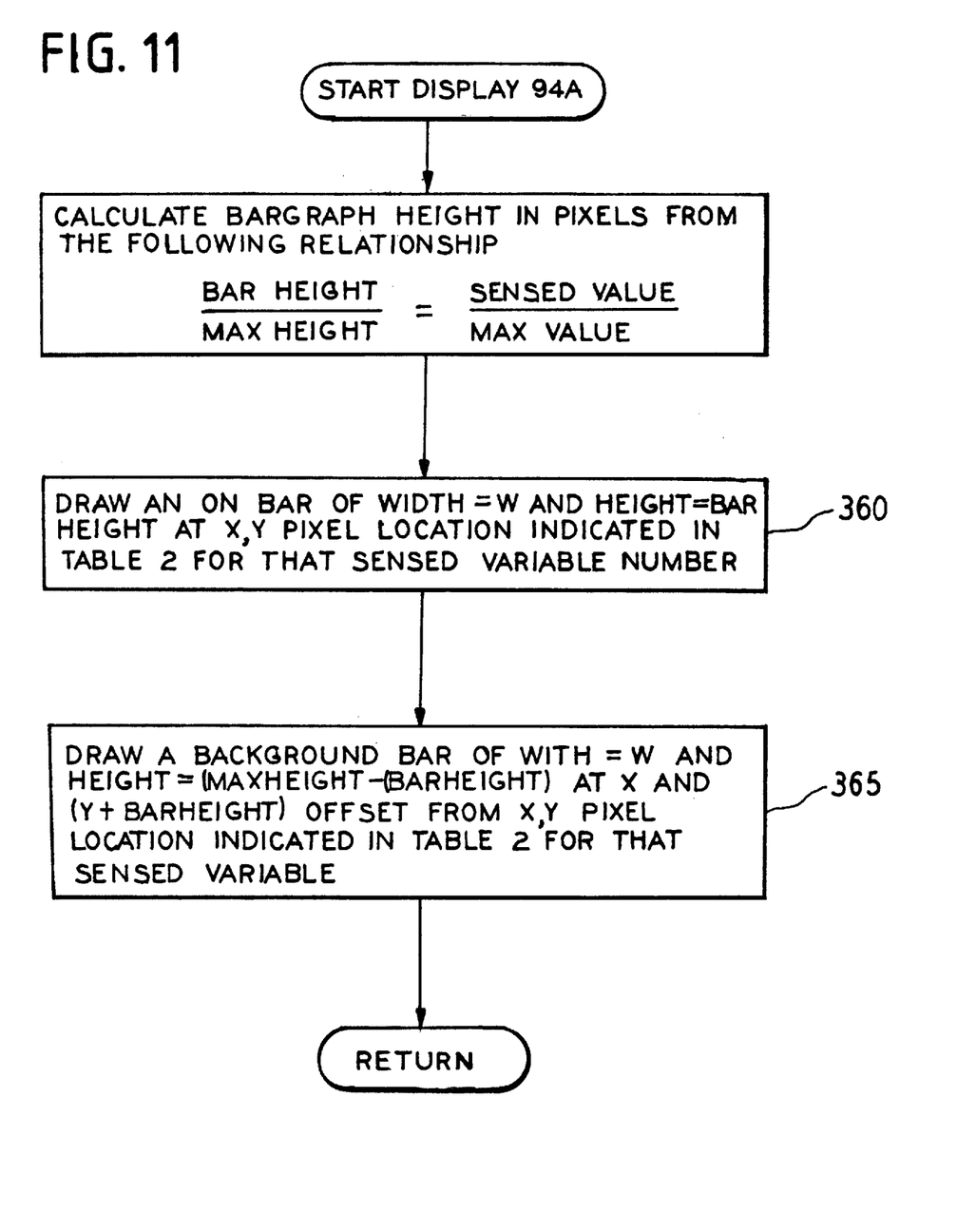
FIG. 11 illustrates a flow chart of a computer program routine for controlling a display of a bar graph that can be used in conjunction with the program of FIG. 10.

In order to understand the program flow charts in FIGS. 10 and 11, a brief description of the typical contents of the external memory, 64 in FIG. 4, will be explained. The contents of this memory would be created by the program, as illustrated in FIG. 6 which is used to select the configuration from all possibilities. The memory contains program data and program instruction code segments.

The program code segment contains the program of the flow chart of FIGS. 10A–10D. It also contains the subprograms such as, but not limited to, the example given as the flow charts of FIG. 10D and FIG. 11. These subprograms begin at memory locations saved into tables located in the program data segment.

In this regard, contents of the program data segment include four tables, and a number of graphic image pixel data files including one designated as the Main Static Graphic Screen Display.

The contents of these tables are as follows:

Table 1: Switch Data
Number of Switch Identities (ID or "Keys)

For each Switch ID, the following data is provided:
  Switch Program Memory Vector
  Switch Location—Upper Left Pixel (X,Y) Location—
    Lower Right Pixel (X,Y) Location Table 2: Data for List of the Parameters to be Displayed
  Number of variable parameters that are to be displayed
  For each variable, the following data is provided:
  Variable Number
  Memory Location Address for Variable Value in the
    Appliance Control Software Module
  Display Program Memory Vector
  Graphical Display Pixel (X,Y) Location Table 3: Data for Status Display Information
Number of status items to be displayed
For each status item, the following data is provided:
  Status display number
  Memory Location Address for Current Status Value in
    the Appliance Control Software Module
  State Identifier for State Currently Displayed Table 4: Data for Display of Graphical Symbols
  Number of Graphical Symbols
  For each Graphical Symbol associated with each Status
    Display Number of Table 3, the following data is
    provided:
  Status Display Number
  State Identifier (for this Status Display Number)
  Memory Location where pixel data for image starts
  Height in pixels of State Image
  Width in pixels of State Image
  Pixel Location, X and Y, where Image is to be displayed
  Memory Location where pixel data for Image Background starts
  Height in pixels of Background for State Image
  Width in pixels of Background for State Image
  Pixel Location, X and Y, where Background is to be
    displayed.

The tables then preferably are arranged as follows:

TABLE 1

SWITCH DATA

| Switch ID | Switch Program Memory Vector | Switch Location | | | |
|---|---|---|---|---|---|
| | | Upper left | | Lower right | |
| | | X1 | Y1 | X2 | Y2 |
| . | . | . | . | . | . |
| . | . | . | . | . | . |
| . | . | . | . | . | . |
| 92A | DOSWITCH 92A | 25 | 32 | 50 | 57 |
| . | . | . | . | . | . |
| . | . | . | . | . | . |
| . | . | . | . | . | . |

TABLE 2

DATA FOR LIST OF THE PARAMETERS TO BE DISPLAYED

| Variable Number | Memory Location of Current Value | Display Program Vector | Graphical Display Pixel Location | |
|---|---|---|---|---|
| | | | X | Y |
| . | . | . | . | . |
| . | . | . | . | . |

TABLE 2-continued

DATA FOR LIST OF THE PARAMETERS TO BE DISPLAYED

| Variable Number | Memory Location of Current Value | Display Program Vector | Graphical Display Pixel Location X | Y |
|---|---|---|---|---|
| . | . | . | . | . |
| . | . | . | . | . |
| 3 | VARIABLE 3 | DISPLAY 94A | 350 | 400 |
| . | . | . | . | . |
| . | . | . | . | . |
| . | . | . | . | . |

TABLE 3

DATA FOR STATUS DISPLAY INFORMATION

| Status Display Number | Appliance Control Memory Location For Current State Identifier | Currently Displayed State Identifier |
|---|---|---|
| . | . | . |
| . | . | . |
| . | . | . |
| 4 | STATE 4 | "ON" |
| . | . | . |
| . | . | . |
| . | . | . |

TABLE 4

DATA FOR DISPLAY OF GRAPHICAL SYMBOLS

| Status Display Number | State Identifier | Start Memory Location of Image Pixel Data | Image Pixel Height | Image Pixel Width | Image Display Location Reference Point X | Image Display Location Reference Point Y | Start Memory Location of Background Pixel | Background Pixel Height | Background Pixel Width | Background Display Reference Point X | Background Display Reference Point Y |
|---|---|---|---|---|---|---|---|---|---|---|---|
| . | . | . | . | . | . | . | . | . | . | . | . |
| . | . | . | . | . | . | . | . | . | . | . | . |
| 4 | ON | OFF4IMAGE | 25 | 30 | 450 | 150 | BACKGROUND4 | 28 | 32 | 448 | 148 |
| . | OFF | ON4IMAGE | 25 | 30 | 450 | 150 | BACKGROUND4 | 28 | 32 | 448 | 148 |
| . | . | . | . | . | . | . | . | . | . | . | . |
| . | . | . | . | . | . | . | . | . | . | . | . |

The flow charts of FIGS. 10A–10D and 11 include steps which should be familiar to one knowledgeable in programming personal computers. These include:

1. Programming graphical display to the monitor 22 in FIG. 1. The techniques of displaying a data file stored in memory in one of the standard formats such as PCX, TIFF, etc. would be used in:
   Step 310 to display the full complete graphical image of, for example, that shown in FIG. 7A.
   Step 340 to display rectangular images of less than full screen size when part of the display is to be changed.
2. Standard techniques as found in most programming languages to draw basic geometric figures as is undertaken in step 360 of the flow chart of FIG. 11.

As is apparent from the foregoing specification, the invention is susceptible of being embodied with various alterations and modifications which may differ particularly from those that have been described in the preceding specification and description. It should be understood that it is intended that such embodiments fall within the scope of any patent issued hereon and all such modifications reasonably and properly come within the scope of this contribution to the art.

We claim as our invention: The embodiments of the invention in which an exclusive property or privilege is claimed are defined as follows:

1. A control system comprising:

a display operatively configured to display function and status information relating to operation of an appliance in an alterable display format configurable by a use, said alterable display format comprising selectively displayable and species specifiable switches, gauges and status indicators, said alterable display format being alterable at least with respect to selection and layout of said switches, gauges and status indicators to display said function information by way of one or more of said switches and said status information by way of one or more of said gauges and status indicators, wherein said gauges and status indicators display said status information in one or two or more display formats selectable by a user;

an appliance control module operatively configured, programmed to be coupled to an appliance and to receive operating information from the appliance and to control operation of the appliance, the appliance control module operatively configured to receive control information for controlling operation of the appliance;

data processing means operatively configured an coupled to the display means for controlling said display format of said information on the display means in accordance with user alterable graphic display element data which identify locations on said display means, switch function data which relate functions to user input data entered by the user, and appliance function timing and operating tables, said data processing means being operatively configured and coupled to the appliance control module to receive appliance operating information from said appliance control module an to provide said control information to said appliance control module;

user input means for allowing a user to enter said user input data into the data processing means and to alter said graphic display element data but not to alter configuration of said data processing means;

a memory coupled to the data processing means, the memory having stored thereon said user alterable graphic display element data identifying locations on said display means, said switch function data relating functions to said user input data, and said appliance function timing and operating parameter tables; and a display driver and memory coupled between the data processing means and the display means for driving the display means under the control of said data processing means.

2. The control system of claim 1, wherein the data processor comprises a personal computer.

3. The control system of claim 1, wherein said display comprises a plurality of display regions, and said user input means further comprises means for direct user input associated with at least two of said display regions.

4. The control system of claim 3, wherein the user input means comprises a mouse.

5. The control system of claim 3, wherein said user input means comprises user touch sensitive inputs.

6. The central system of claim 1, wherein the memory is external to the data processing means.

7. The central system of claim 1, wherein the display driver comprises a video driver.

8. The control system of claim 1, wherein each of said switches may display said function information in one of two or more display formats selectable by a user.

9. The control system of claim 1, wherein said display formats include at least analog and digital formats.

10. A control system comprising:

a display operatively configured to display function relating to operation of an appliance in an alterable display format configurable by a user, said alterable display format comprising selectively displayable and species specifiable switches, gauges and status indicators by of which at least some of said information is displayed, said alterable display format being alterable at least with respect to selection and layout of said switches, gauges and status indicators to display said function information by way of one or more of said switches and said status information by way of one or more of said gauges and status indicators, wherein said gauges and status indicators display said status information in one or two or more display formats selectable by a user;

an appliance control module operatively configured to be coupled to an appliance and to receive operating information from the appliance and to control operation of the appliance, the appliance control module operatively configured to receive control information for controlling operation of the appliance;

a processor operatively configured and coupled to the display means for controlling said display format of said information on the display means in accordance with user input data, graphic display element data which identify locations on said display means at which information is to be displayed, switch function data which relate functions to user input data entered by the user, and appliance function timing and operating tables, said processor being operatively configured and coupled to the appliance control module to receive appliance operating information from said appliance control module and to provide said control information to said appliance control module;

user input means for allowing a user to enter said user input data into the processing means and to alter said graphic display element data but not to alter configuration of said processor;

a memory coupled to the processor, the memory having stored thereon said user alterable graphic display element data identifying locations on said display means at which information is to be displayed, said switch function data relating functions to said user input data, and said appliance function timing and operating parameter tables; and a display driver and memory coupled between the processor and the display means for driving the display means under the control of said processing means.

11. The control system of claim 10, wherein the processor comprises a personal computer.

12. The control system of claim 10, wherein said display comprises a plurality of display regions, and said user input means further comprises means for direct user input associated with at least two of said display regions.

13. The control system of claim 12, wherein the user input means comprises a mouse.

14. The control system of claim 12, wherein said user input means comprises user touch sensitive inputs.

15. The control system of claim 10, wherein the memory is external to the processor.

16. The control system of claim 10, wherein the display driver comprises a video driver.

17. The control system of claim 10, wherein each of said switches may display said function information in one of two or more display formats selectable by a user.

18. The control system of claim 10, wherein said display formats include at least analog and digital formats.

* * * * *